US011318932B2

(12) United States Patent
Yoo et al.

(10) Patent No.: US 11,318,932 B2
(45) Date of Patent: May 3, 2022

(54) VEHICLE DRIVING CONTROLLER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Su Jung Yoo, Incheon (KR); Dong Hwi Lee, Seongnam-si (KR); Jin Su Jeong, Suwon-si (KR); Jae Yong Jeon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 193 days.

(21) Appl. No.: 16/299,547

(22) Filed: Mar. 12, 2019

(65) Prior Publication Data

US 2019/0315346 A1 Oct. 17, 2019

Related U.S. Application Data

(60) Provisional application No. 62/655,831, filed on Apr. 11, 2018.

(30) Foreign Application Priority Data

Dec. 4, 2018 (KR) .......................... 10-2018-0154724

(51) Int. Cl.
*B60W 30/09* (2012.01)
*B60W 30/14* (2006.01)
(Continued)

(52) U.S. Cl.
CPC ............ *B60W 30/09* (2013.01); *B60W 30/14* (2013.01); *B60W 40/09* (2013.01); *B60W 40/10* (2013.01);
(Continued)

(58) Field of Classification Search
CPC ...... B60W 30/09; B60W 30/14; B60W 40/09; B60W 40/10; B60W 50/12; B60W 50/14;
(Continued)

(56) References Cited

U.S. PATENT DOCUMENTS 4,361,202 A 11/1982 Minovitch
5,314,037 A 5/1994 Shaw
(Continued)

FOREIGN PATENT DOCUMENTS

DE 198 21 122 A1 6/1999
DE 101 14 187 A1 9/2002
(Continued)

OTHER PUBLICATIONS

European Search Report dated Mar. 27, 2020 from the corresponding European Application No. 19167264.1, 8 pages.
(Continued)

*Primary Examiner* — Jason Holloway
(74) *Attorney, Agent, or Firm* — Morgan, Lewis & Bockius LLP

(57) ABSTRACT

A vehicle driving controller, a system including the same, and a method thereof are provided. The vehicle driving controller includes a processor configured to apply a different warning level depending on at least one of a driving situation or a user state during autonomous driving and to provide a notification of a control authority transition demand to a user and a storage configured to store information associated with the driving situation and the user state and information associated with the different warning level.

19 Claims, 11 Drawing Sheets

(51) Int. Cl.
*B60W 40/09* (2012.01)
*B60W 40/10* (2012.01)
*B60W 50/12* (2012.01)
*B60W 50/14* (2020.01)
*G05D 1/00* (2006.01)

(52) U.S. Cl.
CPC ............ *B60W 50/12* (2013.01); *B60W 50/14* (2013.01); *G05D 1/0061* (2013.01); *B60W 2050/143* (2013.01); *B60W 2050/146* (2013.01)

(58) Field of Classification Search
CPC ..... B60W 2050/143; B60W 2050/146; B60W 2540/00; B60W 2554/00; B60W 50/082; B60W 30/12; B60W 30/16; B60W 50/0098; B60W 2050/0043; G05D 1/0061
See application file for complete search history.

(56) References Cited

U.S. PATENT DOCUMENTS

| | | |
|---|---|---|
| 5,521,579 A | 5/1996 | Bernhard |
| 6,055,467 A | 4/2000 | Mehring et al. |
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,457,827 B1 | 6/2013 | Ferguson et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,079,571 B2 | 7/2015 | Trost |
| 9,315,178 B1 | 4/2016 | Ferguson et al. |
| 9,527,441 B2 | 12/2016 | Matsumura |
| 9,874,871 B1 | 1/2018 | Zhu et al. |
| 10,183,668 B2 | 1/2019 | Takae |
| 10,324,463 B1 | 6/2019 | Konrardy et al. |
| 10,449,856 B2 | 10/2019 | Kojima |
| 10,451,730 B2 | 10/2019 | Talamonti et al. |
| 10,558,213 B2 | 2/2020 | Sato et al. |
| 10,618,523 B1 | 4/2020 | Fields et al. |
| 10,627,813 B2 | 4/2020 | Tsuji et al. |
| 10,663,971 B2 | 5/2020 | Sugawara et al. |
| 10,676,084 B2 | 6/2020 | Fujii |
| 10,814,913 B2 | 10/2020 | Fujii |
| 10,935,974 B1 | 3/2021 | Fields et al. |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0009910 A1 | 1/2006 | Ewerhart et al. |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2008/0204212 A1 | 8/2008 | Jordan et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1 | 2/2010 | Taguchi et al. |
| 2010/0289632 A1 | 11/2010 | Seder et al. |
| 2011/0169625 A1 | 7/2011 | James et al. |
| 2011/0196592 A1 | 8/2011 | Kashi et al. |
| 2011/0241862 A1 | 10/2011 | Debouk et al. |
| 2011/0251758 A1 | 10/2011 | Kataoka |
| 2011/0293145 A1 | 12/2011 | Nogami et al. |
| 2012/0166032 A1 | 6/2012 | Lee et al. |
| 2012/0296522 A1 | 11/2012 | Otuka |
| 2013/0063595 A1 | 3/2013 | Niem |
| 2013/0066525 A1 | 3/2013 | Tomik et al. |
| 2013/0226406 A1 | 8/2013 | Ueda et al. |
| 2014/0074356 A1 | 3/2014 | Bone |
| 2014/0336896 A1 | 11/2014 | Udaka et al. |
| 2015/0006012 A1 | 1/2015 | Kammel et al. |
| 2015/0006013 A1 | 1/2015 | Wimmer et al. |
| 2015/0019063 A1 | 1/2015 | Lu et al. |
| 2015/0094899 A1 | 4/2015 | Hackenberg et al. |
| 2015/0148985 A1 | 5/2015 | Jo |
| 2015/0166062 A1 | 6/2015 | Johnson et al. |
| 2015/0204687 A1 | 7/2015 | Yoon et al. |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1* | 1/2016 | Fung ..................... B60K 28/02 701/36 |
| 2016/0091897 A1 | 3/2016 | Nilsson et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1 | 8/2016 | Matsumoto |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0297447 A1 | 10/2016 | Suzuki |
| 2016/0339913 A1 | 11/2016 | Yamashita et al. |
| 2016/0349066 A1 | 12/2016 | Chung et al. |
| 2016/0368492 A1* | 12/2016 | Al-Stouhi .............. G08G 1/162 |
| 2017/0003683 A1 | 1/2017 | Sato et al. |
| 2017/0061799 A1 | 3/2017 | Fujii et al. |
| 2017/0108865 A1 | 4/2017 | Rohde et al. |
| 2017/0124882 A1 | 5/2017 | Wang |
| 2017/0171375 A1 | 6/2017 | Kamata |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0240172 A1 | 8/2017 | Nishiguchi et al. |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0308094 A1 | 10/2017 | Abe et al. |
| 2017/0313313 A1 | 11/2017 | Asakura |
| 2017/0315556 A1 | 11/2017 | Mimura |
| 2017/0334460 A1 | 11/2017 | Arakawa et al. |
| 2017/0341652 A1 | 11/2017 | Sugawara et al. |
| 2017/0341653 A1 | 11/2017 | Kubota et al. |
| 2017/0349212 A1 | 12/2017 | Oshida et al. |
| 2017/0368936 A1 | 12/2017 | Kojima |
| 2018/0009437 A1 | 1/2018 | Ooba |
| 2018/0029604 A1 | 2/2018 | Niino et al. |
| 2018/0033309 A1 | 2/2018 | Norwood |
| 2018/0043906 A1 | 2/2018 | Huang |
| 2018/0046185 A1 | 2/2018 | Sato et al. |
| 2018/0050659 A1 | 2/2018 | Coburn |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1 | 6/2018 | Kabe |
| 2018/0162416 A1 | 6/2018 | Honda et al. |
| 2018/0170370 A1 | 6/2018 | Kataoka |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0178801 A1 | 6/2018 | Hashimoto et al. |
| 2018/0178802 A1 | 6/2018 | Miyata |
| 2018/0186376 A1 | 7/2018 | Lee et al. |
| 2018/0188735 A1 | 7/2018 | Sugawara et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |

(56) References Cited

U.S. PATENT DOCUMENTS

| | | |
|---|---|---|
| 2018/0251155 A1 | 9/2018 | Chan et al. |
| 2018/0257669 A1 | 9/2018 | Makke |
| 2018/0281788 A1 | 10/2018 | Uchida |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1 | 12/2018 | Fujii |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1 | 12/2018 | Ungermann |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0047469 A1 | 2/2019 | Nishiguchi et al. |
| 2019/0047561 A1 | 2/2019 | Nishiguchi et al. |
| 2019/0049958 A1 | 2/2019 | Liu et al. |
| 2019/0061766 A1 | 2/2019 | Nishiguchi |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0126927 A1 | 5/2019 | Uejima |
| 2019/0135290 A1 | 5/2019 | Marden et al. |
| 2019/0155279 A1 | 5/2019 | Tayama |
| 2019/0161117 A1 | 5/2019 | Suzuki |
| 2019/0168754 A1 | 6/2019 | Makled et al. |
| 2019/0185005 A1 | 6/2019 | Fukuda |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241198 A1 | 8/2019 | Mori et al. |
| 2019/0250620 A1 | 8/2019 | Huang et al. |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Muto |
| 2019/0291642 A1 | 9/2019 | Chae et al. |
| 2019/0291728 A1 | 9/2019 | Shalev-Shwartz et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0049513 A1 | 2/2020 | Ma |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0189618 A1 | 6/2020 | Ochida |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0391593 A1 | 12/2020 | Lee et al. |
| 2021/0188258 A1 | 6/2021 | Goto et al. |
| 2021/0188262 A1 | 6/2021 | Goto et al. |
| 2021/0188356 A1 | 6/2021 | Goto et al. |

FOREIGN PATENT DOCUMENTS

| | | |
|---|---|---|
| DE | 102004005815 B3 | 6/2005 |
| DE | 10 2004 048 468 A1 | 4/2006 |
| DE | 10 2007 005 245 A1 | 11/2007 |
| DE | 10 2011 016 770 A1 | 11/2011 |
| DE | 10 2011 016 771 A1 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 102016202946 A1 | 9/2016 |
| DE | 102015206969 A1 | 10/2016 |
| DE | 102015209476 A1 | 11/2016 |
| DE | 102015219231 A1 | 4/2017 |
| DE | 10 2016 007187 A1 | 6/2017 |
| DE | 102015224244 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| EP | 19167267.4 | 8/2021 |
| JP | 2000-198458 A | 7/2000 |
| JP | 2003-025868 A | 1/2003 |
| JP | 2015-138330 A | 7/2015 |
| JP | 2016-000602 A | 1/2016 |
| JP | 2016-151815 A | 8/2016 |
| JP | 2016-196285 A | 11/2016 |
| JP | 2019-043169 A | 3/2019 |
| KR | 10-0578573 B2 | 5/2006 |
| KR | 101779823 B1 | 10/2017 |
| KR | 20180070401 | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | WO 2017064941 A1 | 4/2017 |
| WO | 2017-168013 A1 | 10/2017 |
| WO | WO 2017168013 A1 | 10/2017 |
| WO | 2018-033389 A1 | 2/2018 |
| WO | 2017-017793 A1 | 6/2018 |

OTHER PUBLICATIONS

European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362, 27 pp.
U.S. Office Action dated Apr. 24, 2020 from the corresponding U.S. Appl. No. 16/203,884 , 25 pp.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.

(56) References Cited

OTHER PUBLICATIONS

European Search Report dated Aug. 30, 2019 from the corresponding European Application No. 19167269.0, 9 pages.
European Search Report dated Aug. 30, 2019 from the corresponding European Application No. 19167267.4, 8 pages.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.

* cited by examiner

VEHICLE DRIVING CONTROLLER, SYSTEM INCLUDING THE SAME, AND METHOD THEREOF

CROSS-REFERENCE TO RELATED APPLICATION

The present application claims priority to and the benefit of Korean Patent Application No. 10-2018-0154724, filed in the Korean Intellectual Property Office on Dec. 4, 2018 and U.S. Patent Application No. 62/655,831, filed in the US Patent and Trademark Office on Apr. 11, 2018, the entire contents of which are incorporated herein by reference.

TECHNICAL FIELD

The present disclosure relates to a vehicle driving controller, a system including the same, and a method thereof, and more particularly, relates to technologies about a control authority transition demand according to a driving environment and/or a user state during autonomous driving.

BACKGROUND

The statements in this section merely provide background information related to the present disclosure and may not constitute prior art.

There is a driver assist system for assisting a driver who is driving to perform autonomous driving. For example, the driver assist system may include an adaptive cruise control (ACC), a lane departure warning system (LDWS), a lane keeping system (LKS), and the like.

Such a driver assist system enhances the convenience of driving by automatically controlling a portion of longitudinal control or lateral control of the driver. On the other hand, there are constraints in which such a driver assist system (an autonomous system) should prepare such that the driver intervenes. Thus, in a situation where the driver performs drowsy driving or is unable to drive his or her vehicle due to his or her health problems, a conventional driver assist system does not assist the driver.

When there is a situation to which it is difficult for the driver assist system to correspond, it is important to notify a user that there is the situation depending on a driving situation or a user state and safely hand over control authority to the user. However, in the related art, there are no technologies of warning the user and handing over control authority to the user depending on a driving situation and a user situation.

SUMMARY

An aspect of the present disclosure provides a vehicle driving controller for differently applying a control authority transition demand method depending on a driving environment and/or a user state in an autonomous driving environment such that a user safely corresponds to a risk situation, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle driving controller may include: a processor configured to differently apply a warning level depending on at least one or more of a driving situation and a user state during autonomous driving and provide a notification of a control authority transition demand to a user and a storage storing information associated with the driving situation and the user state and information associated with a warning level determined by the processor.

The driving situation may include whether there is collision risk within a predetermined time or whether there is out of an operational design domain (ODD) capable of performing the autonomous driving.

The processor may be configured to track a static object and a dynamic object, generate a static grid map and a dynamic object list, and extract map information.

The processor may be configured to generate a driving trajectory of a host vehicle and determine whether there is intersection between the driving trajectory of the host vehicle and the static grid map or whether there is intersection between the driving trajectory of the host vehicle and a trajectory of a dynamic object of the dynamic object list to determine there is collision.

The processor may be configured to determine a time when there is out of the ODD and a type where there is out of the ODD, based on the map information.

The type where there is out of the ODD may include, when a host vehicle is able to travel during a predetermined time after there is out of the ODD and, when the host vehicle is unable to travel after there is out of the ODD.

The processor may be configured to determine at least one or more of whether the user state is a "hands-off" state, whether the user state is an "eyes-off" state, and whether the user state is a "mind-off" state.

The processor may be configured to change and apply a notification reference time, which is a notification time, depending on the user state.

The processor may be configured to set the notification reference time to be shorter in an order of the "hands-off" state, the "eyes-off" state, and the "mind-off" state.

The processor may be configured to determine the warning level to be higher in an order of the "hands-off" state, the "eyes-off" state, and the "mind-off" state.

The processor may be configured to determine whether the user state is the "eyes-off" state or whether the user is the "mind-off" state when there is no driving risk in the driving situation to determine a warning level, provide the notification of the control authority transition demand depending on the determined warning level, and increase the warning level, when a predetermined time elapses.

The processor may be configured to differently apply the warning level depending on an expected time when collision risk will occur or an expected time when there will be out of an ODD.

The warning level may include level 1 for providing a visual warning, level 2 for providing a visual warning and an audible warning, level 3 for providing a visual warning and an audible warning, the visual warning being provided in a color different from a color of the visual warning in levels 1 and 2 and the audible warning being output with a sound higher than the sound upon the audible warning in level 2, and level 4 for providing a visual warning in a color different from the colors in levels 1 to 3, providing an audible warning with the highest sound magnitude, and performing an emergency call mode operation.

The processor may be configured to determine a minimum risk maneuver (MRM) depending on the warning level, when control authority is not handed over to the user after providing the notification of the control authority transition demand depending on the warning level and perform vehicle control depending on the MRM.

The MRM may include at least one of constant-speed driving control after decelerating at a constant speed, stop control, and shoulder stop control.

According to another aspect of the present disclosure, a vehicle system may include: a vehicle driving controller configured to differently apply a warning level depending on at least one or more of a driving situation and a user state during autonomous driving and provide a notification of a control authority transition demand to a user and a warning device configured to provide a warning according to the warning level.

The warning device may be configured to provide at least one or more of a visual warning, an audible warning, and an emergency call mode.

According to another aspect of the present disclosure, a vehicle driving control method may include: determining at least one or more of a driving situation and a user state during autonomous driving and differently applying a warning level depending on at least one or more of the driving situation and the user state and providing a notification of a control authority transition demand to a user.

The method may further include determining an MRM depending on the warning level, when control authority is not handed over to the user after providing the notification of the control authority transition demand depending on the warning level and performing vehicle control depending on the MRM.

The driving situation may include whether there is collision risk within a predetermined time or whether there is out of an ODD capable of performing the autonomous driving.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
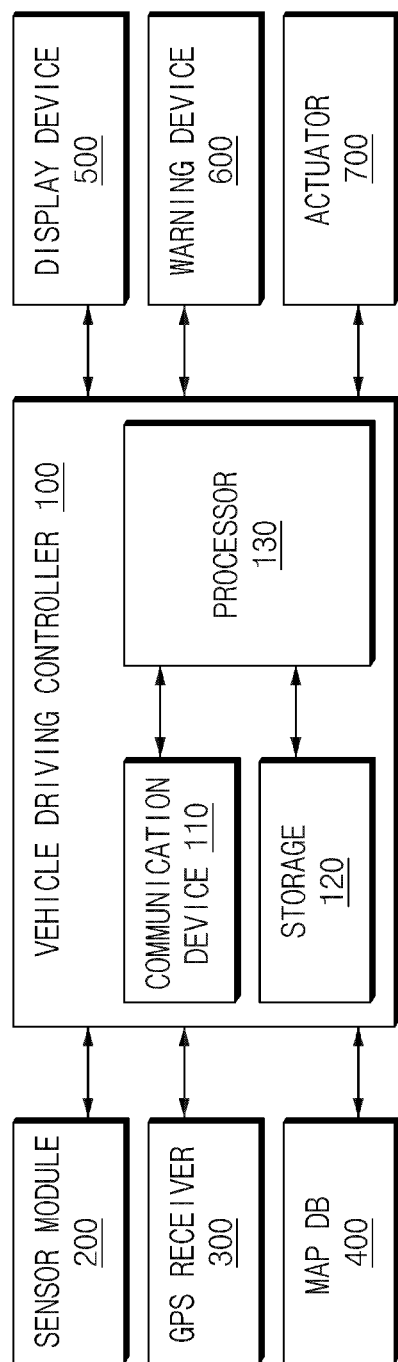
FIG. 1 is a block diagram illustrating a configuration of a vehicle system including a vehicle driving controller in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In adding reference denotations to elements of each drawing, although the same elements are displayed on a different drawing, it should be noted that the same elements have the same denotations. In addition, in describing some forms of the present disclosure, if it is determined that a detailed description of related well-known configurations or functions blurs the gist of some forms of the present disclosure, it will be omitted.

In describing elements of some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Some forms of the present disclosure may be technology of differently applying a warning level depending on a driving environment and/or a user state during autonomous driving, providing a notification of a control authority transition demand to a user, and performing vehicle control depending on a minimum risk maneuver (MRM) when control authority is not handed over to the user and may be applied to autonomous driving technology.

Hereinafter, a description will be given in detail of some forms of the present disclosure with reference to FIGS. 1 to 10.

FIG. 1 is a block diagram illustrating a configuration of a vehicle system including a vehicle driving controller in some forms of the present disclosure.

Referring to FIG. 1, the vehicle system may include a vehicle driving controller 100, a sensor module 200, a global positioning system (GPS) receiver 300, a map database (DB) 400, a display device 500, a warning device 600, and an actuator 700.

The vehicle driving controller 100 may differently apply a warning level depending on at least one or more of a driving situation and/or a user state during autonomous driving and may provide a notification of a control authority transition demand to a user. Furthermore, when the user does not take over control authority after receiving the notification of the control authority transition demand, the vehicle driving controller 100 may determine a minimum risk maneuver (MRM) depending on a warning level and may perform autonomous driving control of a vehicle depending on the determined MRM.

The vehicle driving controller 100 may include a communication device 110, a storage 120, and a processor 130.

The communication device 110 may be a hardware device implemented with various electronic circuits to transmit and receive a signal over a wireless or wired connection. In some forms of the present disclosure, the communication device 110 may perform in-vehicle communication through controller area network (CAN) communication, local interconnect network (LIN) communication, or the like and may communicate with the sensor module 200, the GPS receiver 300, the map DB 400, the display device 500, the warning device 600, the actuator 700, and the like.

The storage 120 may store information associated with a sensing result of the sensor module 200 and information associated with a driving situation, a user state, a warning level, or the like obtained by the processor 130. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below.

The processor 130 may differently apply a warning level depending on at least one or more of a driving situation and a user state during autonomous driving to provide a notification of a control authority transition demand. When the user does not take over control authority after receiving the notification of the control authority transition demand, the processor 130 may determine an MRM according to the warning level and may perform autonomous driving control of the vehicle, thus avoiding a risk situation.

In this case, the driving situation may include whether there is collision risk within a predetermined time or whether there is out of an operational design domain (ODD) capable of performing autonomous driving. In other words, the driving situation may refer to situation information associated with whether there is a probability of collision within a predetermined time or whether the vehicle departs from the ODD.

The ODD may be a range set to perform a function of an autonomous system and may be set in consideration of conditions such as a geographic condition, a road condition, an environmental condition, and a driving condition. In other words, for safe driving, it is able to perform a system operation for autonomous driving on a highway, a limited-access road, or the like, but it is unable to perform a system operation for autonomous driving on a general road, a junction/interchange (JC/IC), a tollgate, or the like.

The processor 130 may track a static object and a dynamic object based on information received from the sensor module 200 and the GPS receiver 300 to generate a static grid map and a dynamic object list and may extract map information from the map DB 400. In this case, the dynamic object may be listed on the dynamic object list, and the dynamic object list may include information such as a type or trajectory of the dynamic object.

The processor 130 may generate a driving trajectory of a host device based on information received from the sensor module 200 and the GPS receiver 300 or a navigation device (not shown) and may determine whether the driving trajectory of the host device and the static grid map intersect each other or whether the driving trajectory of the host device and a trajectory of a dynamic object included in the dynamic object list intersect each other to determine whether there is collision. In other words, when there is a point (a point of intersection) where the driving trajectory of the host vehicle and the static grid map meet each other or where the driving trajectory of the host vehicle and the trajectory of the dynamic object meet each other, it is meant that collision occurs.

Furthermore, the processor 130 may determine a time when there is out of an ODD and a type where there is out of the ODD, based on map information. Information about the time when there is the ODD may be time information at a time when there is out of the ODD. Information about the type where there is out of the ODD may include type information when the host vehicle is able to travel during a predetermined time after there is out of the ODD and type information when the host vehicle is unable to travel after there is out of the ODD.

The processor 130 may determine at least one or more of whether the user state is a "hands-off" state, whether the user state is an "eyes-off" state, and whether the user state is a "mind-off" state. The determining of the user state may be determining whether the user is not focused on driving and is in a reckless state. In other words, the "hands-off" state may be a state where the user does not grip a steering wheel. The "eyes-off" state may be a reckless state, for example, a state where the user sees a movie without keeping his or her eyes on the road. The "mind-off" state may be a state where the user is unable to drive the vehicle, for example, a state where the user dozes or gets drunk.

When a state where a value measured by a steering wheel torque sensor is less than a predetermined value and where there is no change in steering angle stays over a predetermined time, the processor 130 may determine that the user does not grip the steering wheel to determine the user state as the "hands-off" state. In this case, the user should be in an "eyes-on" state and a "mind-on" state. The processor 130 may determine the user state as the "eyes-off" state when a time when the user does not keep his or her eyes on the road stays over a predetermined time, based on information about the line of sight of the user, information about a face direction of the user, or the like from image data. In this case, the user should be in the "mind-on" state. The processor 130 may extract information associated with blinking of the eyes of the user, a yawn of the user, or the like based on information about a user look from image data and may determine drowsy driving of the user. Alternatively, when the user is unable to drive the vehicle, the processor 130 may determine the user state as the "mind-off" state. The processor 130 may generate one of a "hands-off" flag, an "eyes-off" flag, or a "mind-off" flag.

When determining a warning level, the processor 130 may determine the warning level to be higher in an order of the "hands-off" state, the "eyes-off" state, and the "mind-off" state and may set a notification reference time (a notification period) to be shorter in an order of the "hands-off" state, the "eyes-off" state, and the "mind-off" state. For example, the processor 130 may determine the notification period to 100 meters when the user state is the "hands-off" state and may determine the notification period to 10 meters when the user state is the "mind-off" state.

In other words, the processor 130 may change and apply the notification reference time, which is a notification time, depending on a user state. The processor 130 may determine that risk increases in an order of the "hands-off" state, the "eyes-off" state, and the "mind-eye" state. In case of the "hands-off" state, the processor 130 may set the notification reference time to be longest. In case of the "mind-off" state, the processor 130 may set the notification reference time to be shortest. For example, when collision is expected at a 100-meter point, the processor 130 may provide a notification of a control authority transition demand at a 50-meter point before the vehicle arrives at a point to collision when the user is in the "hands-off" state or may provide the notification of the control authority transition demand from a 10-meter point before the vehicle arrives at the point to collision when the user is in the "mind-off" state, and may increase a warning level.

When there is no driving risk in a driving situation, the processor 130 may determine whether the user state is the "eyes-off" state or the "mind-off" state to determine a warning level and may provide a notification of a control authority transition demand depending on the determined warning level. When a predetermined time elapses, the processor 130 may increase the warning level.

Moreover, the processor 130 may differently apply a warning level depending on an expected time when collision risk will occur or an expected time when there will be out of an ODD. In other words, the processor 130 may provide a visual warning in warning level 1 and may provide a visual warning and an audible warning together in warning level 2. The processor 130 may provide a visual warning and an audible warning in warning level 3, the visual warning being provided in a color different from a color of the visual warning of warning levels 1 and 2 and the audible warning being output with a sound higher than a sound level upon the audible warning in warning level 2. In warning level 4, the processor 130 may provide a visual warning in a color different from the colors upon the visual warning in warning levels 1 to 3, may provide an audible warning with the highest sound level, and may perform an emergency call mode operation.

After providing a notification of a control authority transition demand depending on a warning level, when control authority is not handed over to the user, the processor 130 may determine an MRM depending on the warning level and may perform vehicle control depending on the MRM. The MRM may include at least one of constant-speed driving control after deceleration at a constant speed, stop control, and shoulder stop control. For example, the processor 130 may perform shoulder stop control in warning level 4 or may perform constant-speed driving control in warning level 1.

The sensor module 200 may include a plurality of sensors for sensing an object outside the vehicle and may obtain information associated with a location of the object, a speed of the object, a movement direction of the object, and/or a type (e.g., a vehicle, a pedestrian, a bicycle, a motorcycle, or the like) of the object. To this end, the sensor module 200 may include an ultrasonic sensor, a radar sensor, a light detection and ranging (LiDAR) sensor, a camera, a laser scanner and/or a corner radar, an acceleration sensor, a yaw rate sensor, a torque sensor and/or a wheel speed sensor, a steering angle sensor, a steering wheel torque sensor, or the like.

In some forms of the present disclosure, the sensor module 200 may sense a dynamic object and a static object around the vehicle by means of the ultrasonic sensor, the radar sensor, the LiDAR sensor, the camera, or the like and may provide the sensed information to the processor 130. Furthermore, the sensor module 200 may obtain information about a line of sight of the user, information about a face direction of the user, or information about a user look from image data of the camera and may obtain information about a steering angle from the steering angle sensor, thus providing the obtained information to the processor 130.

The GPS receiver 300 may receive a GPS signal transmitted from a GPS satellite and may provide the received GPS signal to the processor 130. The GPS signal may be used to ascertain a current location of the vehicle.

The map DB 400 may store map information for controlling autonomous driving of the vehicle and may provide the map information to the processor 130. In this case, the map information may include information associated with a type (e.g., a highway, a limited-access road, a general road, or the like) of a road on which the vehicle is currently traveling, whether there is a tollgate, or whether there is a JC/IC.

The display device 500 may be controlled by the vehicle driving controller 100 to display a visual warning for a notification of a control authority transition demand and differently display a color a visual warning according to a warning level. Furthermore, the display device 500 may display vehicle control information during autonomous driving as well as a control authority transition demand to provide the displayed information to the user.

The display device 500 may be implemented as a head-up display (HUD), a cluster, an audio video navigation (AVN), or the like. Furthermore, the display device 500 may receive a color input or the like directly from the user using a user setting menu (USM) of the cluster. Moreover, the display device 500 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and a three-dimensional (3D) display. Some thereof may be implemented as transparent displays configured as a transparent type or a semi-transparent type to see the outside. Moreover, the display device 500 may be implemented as a touchscreen including a touch panel to be used as an input device other than an output device.

The warning device 600 may output a visual warning or a sound notification (a beep sound) for a notification of a control authority transition demand or may perform an emergency call mode or the like. The warning device 600 may change a color of a visual warning depending on a warning level determined by the processor 130 and may output the changed visual warning, or may change sound strength and may output the changed sound.

Furthermore, the warning device 600 may provide a warning such as a notification of a driving risk situation during autonomous driving. The warning device 600 may have a configuration for providing visual, audible, tactile warnings and may be implemented with a HUD, a cluster, an AVN, a pop-up speaker, or the like.

The actuator 700 may be configured to be controlled by the vehicle driving controller 100 and control a steering angle, acceleration, braking, engine driving, or the like of the vehicle and may include a steering wheel, an actuator interlocked with the steering wheel, and a controller for controlling the actuator, a controller for controlling a brake, a controller for a speed of the vehicle, or a controller, configured to control a transmission of the vehicle, for controlling a gear, a clutch, or the like.

As such, some forms of the present disclosure may determine a driving situation and/or a user state and may determine a warning level and a notification period, thus providing a notification of a control authority transition demand depending on the warning level and the notification period. When the user does not take over control authority, some forms of the present disclosure may continue increasing a warning level to provide a notification or may continue reducing a notification period to provide a notification. Moreover, when the user does not take over control authority, some forms of the present disclosure may determine an MRM according to a warning level and may perform autonomous driving control of the vehicle, thus minimizing a risk situation driving during autonomous driving of the vehicle to perform safe driving.

Figure 2:
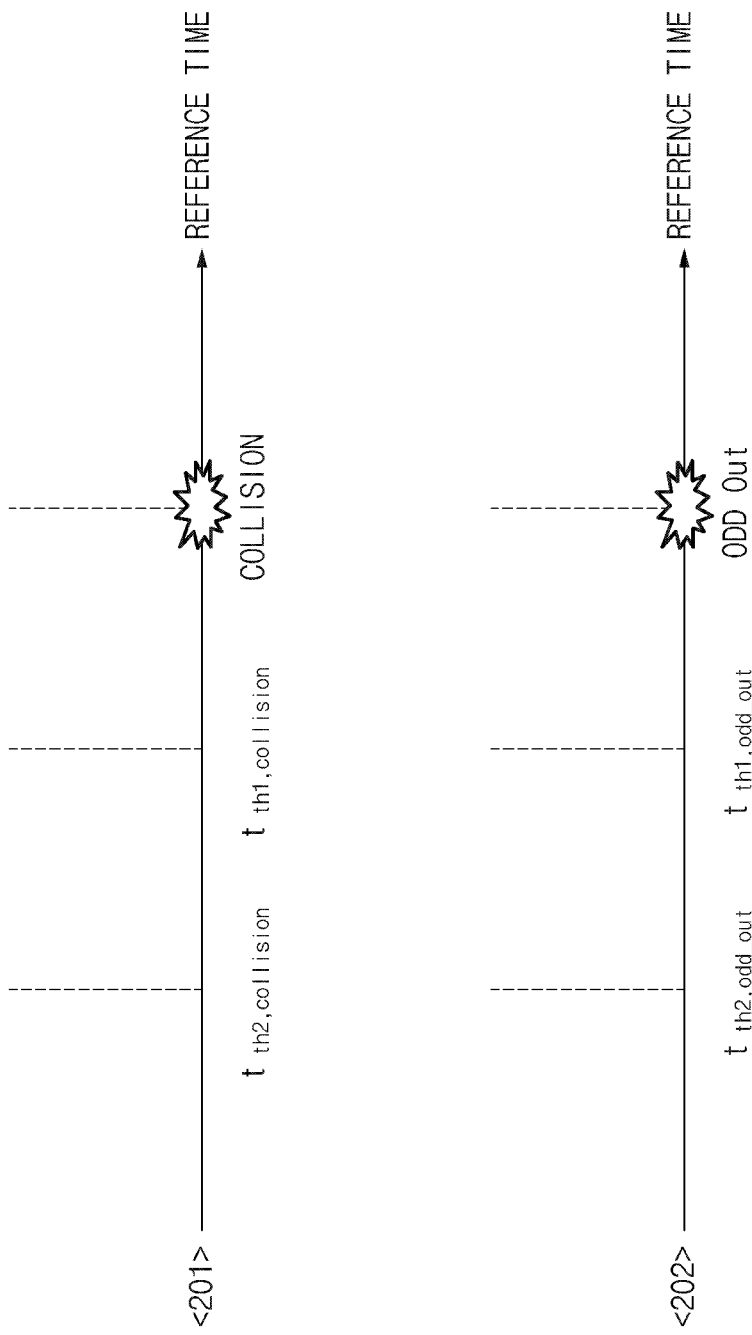
FIG. 2 is a drawing illustrating an exemplary method for determining a warning level upon a driving risk in one form of the present disclosure.

Hereinafter, a description will be given in detail of an example of determining a warning level upon driving risk with reference to FIG. 2. FIG. 2 is a drawing illustrating an exemplary method for determining a warning level upon a driving risk in some forms of the present disclosure. A description will be given of an example of determining a warning level when collision risk occurs and when there is out of an ODD with reference to reference numerals 201 and 202 of FIG. 2.

Notification start condition when there is no driving risk
1. When there is no driving risk, but when an "eyes-off" state continues during a predetermined time, a vehicle driving controller 100 of FIG. 1 may enter warning level 2 and may increase a warning level over time. Subsequently, the vehicle driving controller 100 may increase the warning level to warning levels 3 and 4 and may provide a notification, but when control authority transition is not performed, the vehicle driving controller 100 may perform stop control.
2. When there is no driving risk, but when a "mind-off" state continues during a predetermined time, the vehicle driving controller 100 may enter warning level 3 and may increase a warning level over time. The vehicle driving controller 100 may enter warning level 4 and may provide a notification, but when control authority transition is not performed, the vehicle driving controller 100 may perform shoulder stop control.

Notification start condition when there is driving risk
1. State where collision risk is expected.
① collision occurs after a first reference time $t_{th1,collision}$
    Warning 2 level when a user in a "hands-off" state
    Stop control when the user in an "eyes-off" state and in case of warning 2 level
    Shoulder stop control when the user in a "mind-off" state and in case of warning level 3
② Collision occurs after a second reference time $t_{th2,collision}$ shorter than the first reference time $t_{th1, collision}$ (between the second reference time and the first reference time)
    Stop control when the user in the "hands-off" state and in case of warning 3 level
    Stop control when the user in the "eyes-off" state and in case of warning 4 level
    Shoulder stop control when the user in the "mind-off" state and in case of warning level 4
2. State where there will be out of an ODD
① There is out of the ODD after a first reference time $t_{th1,odd\_out}$
    Constant-speed driving control when the user in the "hands-off" state and in case of warning 1 level
    Constant-speed driving control when the user in the "eyes-off" state and in case of warning 2 level
    Shoulder stop control when the user in the "mind-off" state and in case of warning level 3
② There is out of the ODD after a second reference time $t_{th2,odd\_out}$ shorter than the first reference time $t_{th1,odd\_out}$ (between the second reference time and the first reference time)
    Constant-speed driving control when the user in the "hands-off" state and in case of warning 2 level
    Stop control when the user in the "eyes-off" state and in case of warning 3 level
    Shoulder stop control when the user in the "mind-off" state and in case of warning level 4

Figure 3:
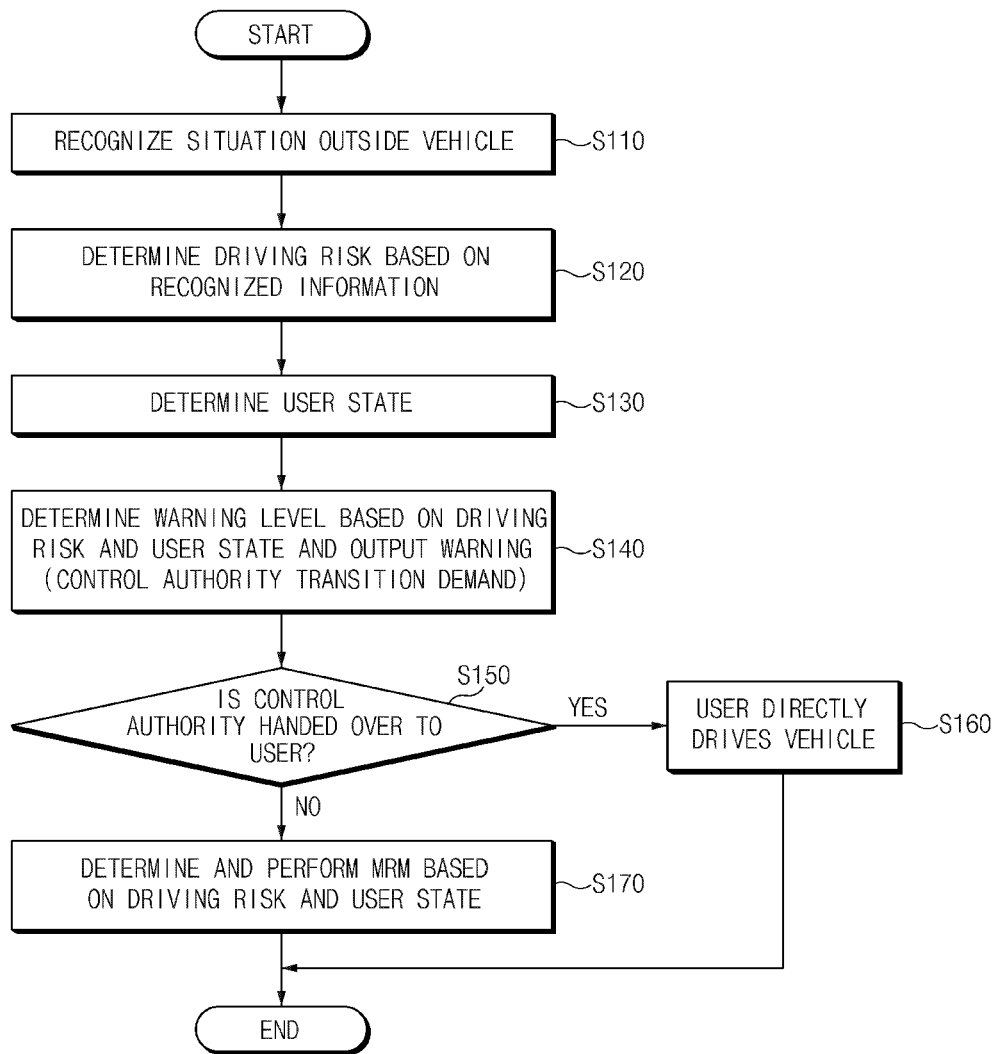
FIG. 3 is a flowchart illustrating a vehicle driving control method in one form of the present disclosure.

Hereinafter, a description will be given in detail of a vehicle driving control method in some forms of the present disclosure with reference to FIG. 3. FIG. 3 is a flowchart illustrating a vehicle driving control method in some forms of the present disclosure.

Hereinafter, it is assumed that a vehicle driving controller 100 of FIG. 1 performs a process of FIG. 3. Furthermore, in a description of FIG. 3, an operation described as being performed by the vehicle driving controller 100 may be understood as being controlled by a processor 130 of the vehicle driving controller 100.

Referring to FIG. 3, in operation S110, the vehicle driving controller 100 may recognize a situation outside a host vehicle based on information received from a sensor module 200, a GPS receiver 300, and a map DB 400. In this case, the recognizing of the situation outside the host vehicle may include generating a static grid map through tracking of a static object, generating a dynamic object list through tracking of a dynamic object, or extracting map information.

In operation S120, the vehicle driving controller 100 may determine driving risk based on the recognized information. Based on the static grid map and the dynamic object list, the vehicle driving controller 100 may determine whether a driving trajectory of the host vehicle and a static grid map intersects each other and may determine whether the driving trajectory of the host vehicle and a trajectory of a dynamic object intersect each other to determine whether there is collision and a time to collision (TTC). Furthermore, the vehicle driving controller 100 may determine whether there is out of an ODD based on map information. In other words, the vehicle driving controller 100 may output information about a type where there is out of the ODD and information about a time when there is out of the ODD, based on map information.

In operation S130, the vehicle driving controller 100 may determine a user state based on information received from the sensor module 200. In this case, the user state may include at least one or more of a "hands-off" state, an "eyes-off" state, or a "mind-off" state.

In operation S140, the vehicle driving controller 100 may determine a warning level based on the driving risk and the user state and may output a warning (a control authority transition demand).

When the user takes over control authority in operation S150 after outputting the warning, in operation S160, the user may directly drive the host vehicle. When the user does not take over the control authority in operation S150, in operation S170, the vehicle driving controller 100 may determine an MRM based on the driving risk and the user state and may perform vehicle control according to the MRM.

Figure 4A:
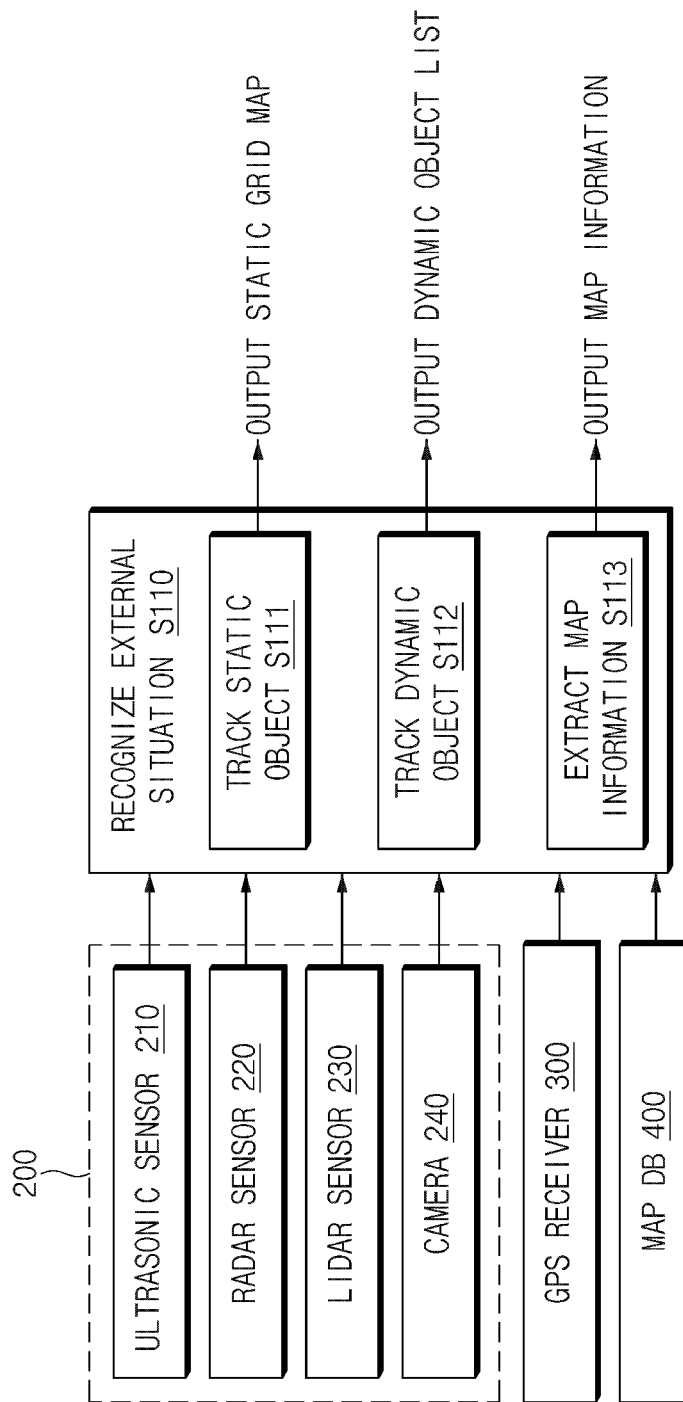
FIG. 4A is a drawing illustrating an exemplary operation of recognizing a situation outside a vehicle in a vehicle driving controller in one form of the present disclosure.

FIG. 4A is a drawing illustrating an exemplary operation of recognizing a situation outside a vehicle in a vehicle driving controller in some forms of the present disclosure.

Referring to FIG. 4A, a vehicle driving controller 100 of FIG. 1 may track (S111) a static object to output a static grid map, may track (S112) a dynamic object to generate and output a dynamic object list, and may extract map information to output the map information, based on information received via an ultrasonic sensor 210, a radar sensor 220, a LiDAR sensor 230, a camera 240, a GPS receiver 300, or a map DB 400.

In this case, the vehicle driving controller 100 may represent and output a static object of a surrounding environment on a grid map and may predict a location of a dynamic object, a speed of the dynamic object, an acceleration of the dynamic object, a current driving lane, and a driving trajectory to generate and output a dynamic object list. Furthermore, the vehicle driving controller 100 may search for a section where the host vehicle is currently traveling, based on a current location and a map DB and may transmit geographic/road information about the section where the host vehicle is currently traveling. In this case, the geographic/road information may include information associated with a main line of a highway, a JC/IC, a tollgate, a limited-access road, a general road, or the like.

Figure 4B:
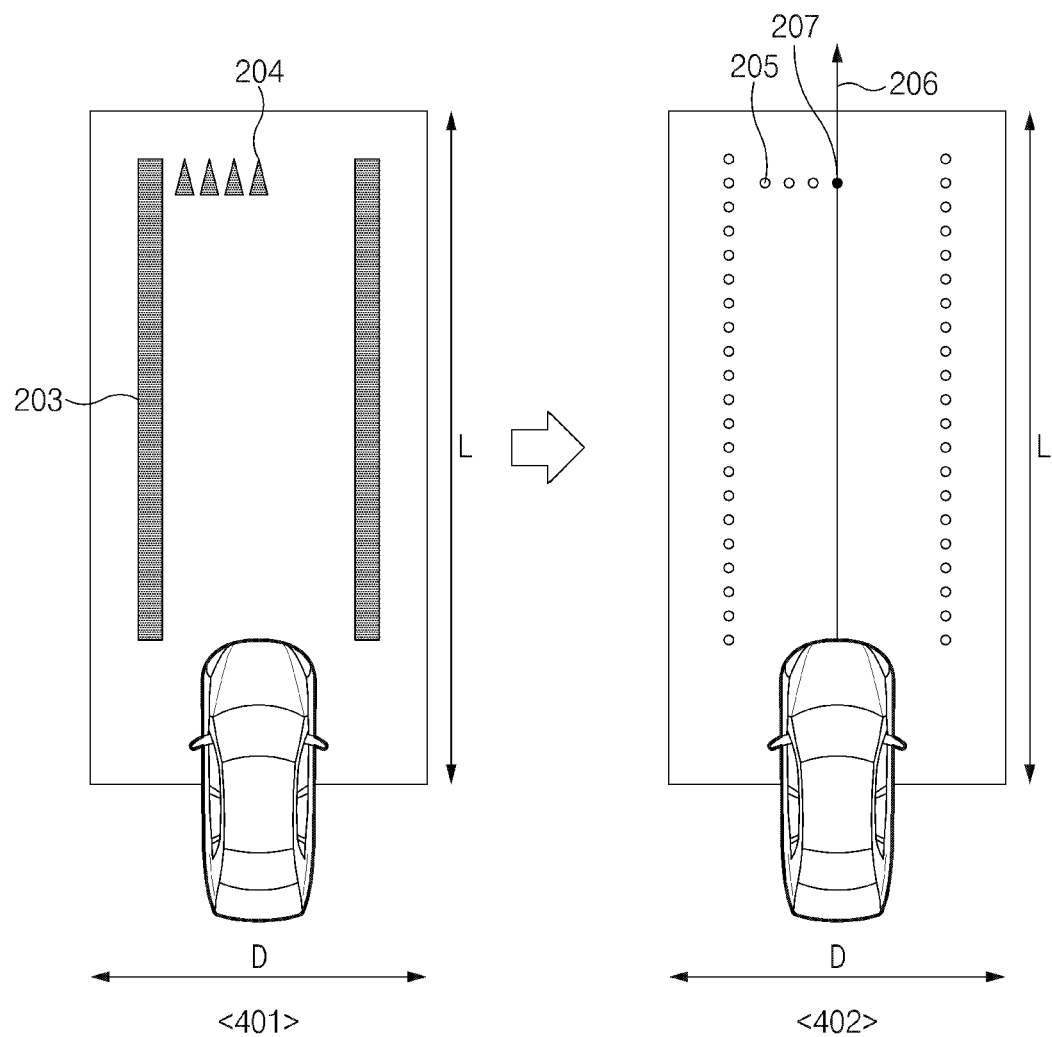
FIG. 4B is a drawing illustrating an example of extracting a shape of a static object and generating a static grid map in one form of the present disclosure.

FIG. 4B is a drawing illustrating an example of extracting a shape of a static object and generating a static grid map in some forms of the present disclosure.

As shown reference numeral 401 of FIG. 4B, after static objects 203 and 204 are detected from a radar sensor 220, a LiDAR sensor 230, or a camera 240 of FIG. 4A, when shapes of the static objects 203 and 204 are extracted, as shown in reference numeral 402, a vehicle driving controller 100 of FIG. 1 may represent the shapes of the static objects 203 and 204 as points 205 of a grid map.

Figure 5:
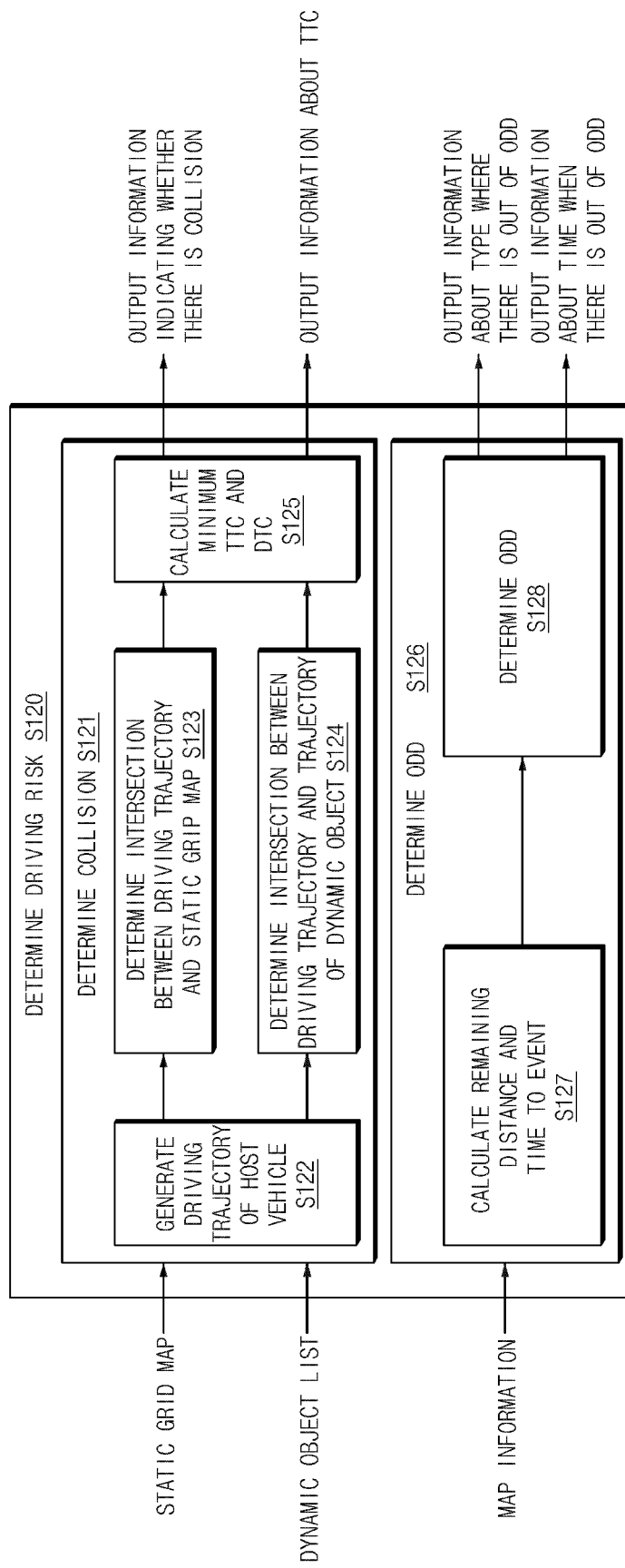
FIG. 5 is a drawing illustrating an exemplary operation of determining a driving risk in a vehicle driving controller in one form of the present disclosure.

FIG. 5 is a drawing illustrating an exemplary operation of determining a driving risk in a vehicle driving controller in some forms of the present disclosure.

Referring to FIG. 5, in operation S121, a vehicle driving controller 100 of FIG. 1 may determine collision using a static grid map and a dynamic object list. In operation S126, the vehicle driving controller 100 may determine whether there is out of an ODD using map information or the like.

In operation S122, the vehicle driving controller 100 may generate a driving trajectory of a host vehicle based on a current driving lane. In operation S123, the vehicle driving controller 100 may determine whether there is a point of intersection between the driving trajectory of the host vehicle and a grid map. In operation S124, the vehicle driving controller 100 may determine whether there is a point of intersection between the driving trajectory of the host vehicle and a trajectory of a dynamic object. The vehicle driving controller 100 may determine whether there is a point 207 of intersection between a static object 205 shaped with points of a grid map 402 generated shown in FIG. 4B and a driving trajectory 206 of the host vehicle. In this case, the occurrence of the point 207 of intersection may mean that collision occurs, and a time to the point 207 of intersection may refer to a TTC of a static object and a dynamic object. In operation S125, the vehicle driving controller 100 may calculate a minimum TTC and distance to collision (DTC).

In operation S127, the vehicle driving controller 100 may calculate the remaining distance and time to an event from map information based on location information of the host vehicle. In operation S128, the vehicle driving controller 100 may determine an ODD. In this case, the ODD may refer to a domain capable of performing autonomous driving, and the event may refer to a point capable of performing autonomous driving. For example, when the host vehicle travels on a highway which belongs to a range of the ODD and then travels on a general road which is not within the range of the ODD, the vehicle driving controller 100 may regard a domain before the host vehicle enters the general road (event) as the ODD and may determine a time when the host vehicle enters the general road as a point where there is out of the ODD.

A type where there is out of the ODD may be classified as i) the host vehicle is able to travel after there is out of the ODD and ii) the host vehicle is unable to travel after there is out of the ODD. Furthermore, when the host vehicle is able to travel after there is out of the ODD may include when the host vehicle exits from a highway and then enters a general road or when the host vehicle is affected by weather such as rain or the like. When the host vehicle is unable to travel after there is out of the ODD may include when there is a line which disappears or when there is no line.

Figure 6:
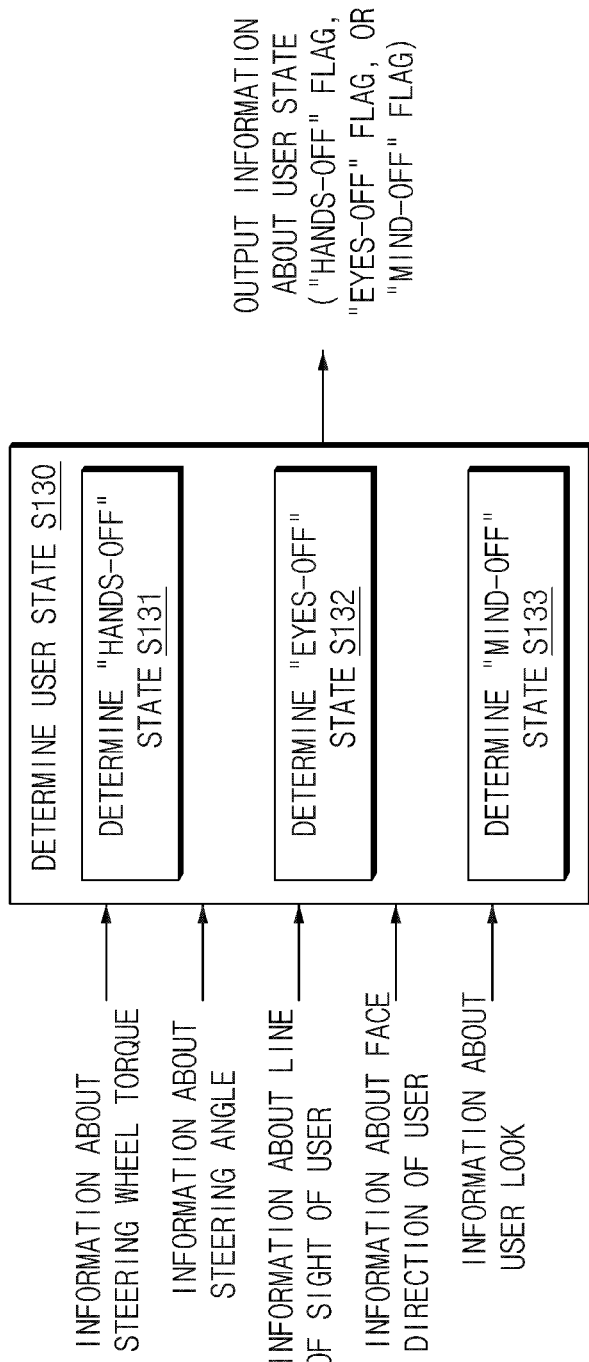
FIG. 6 is a drawing illustrating an exemplary operation of determining a user state in a vehicle driving controller in one form of the present disclosure.

FIG. 6 is a drawing illustrating an exemplary operation of determining a user state in a vehicle driving controller in some forms of the present disclosure.

Referring to FIG. 6, a vehicle driving controller 100 of FIG. 1 may determine a user state. For example, the vehicle driving controller 100 may determine whether the user state is a "hands-off" state, an "eyes-off" state, or a "mind-off" state. In this case, the "hands-off" state may be a state where a user does not grip a steering wheel. The "eyes-off" state may be a state where the user closes his or her eyes. The "mind-off" state may be state where the user is drowsy. A "hands-on" state, an "eyes-on" state, or a "mind-on" state may refer to a state respectively opposite to the "hands-off" state, the "eyes-off" state, or the "mind-off" state.

In operation S131, the vehicle driving controller 100 may determine whether the user state is the "hands-off" state based on information about a steering wheel torque and information about a steering angle. For example, when a state where a value measured by a steering wheel torque sensor is less than a predetermined value and where there is no change in steering angle stays over a predetermined time, the vehicle driving controller 100 may determine that the user does not grip the steering wheel to generate a "hands-off" flag. In this case, the user should be in the "eyes-on" state and the "mind-on" state.

In operation S132, the vehicle driving controller 100 may determine whether the user state is the "eyes-off" state based on information about a line of sight of the user and information about a face direction of the user. For example, the vehicle driving controller 100 may track a line of sight of the user and a face direction of the user. When a time when the user does not keep his or her eyes on the road stays over a predetermined time, the vehicle driving controller 100 may generate an "eyes-off" flag. In this case, the user should be in the "mind-on" state.

In operation S133, the vehicle driving controller 100 may determine whether the user state is the "mind-off" state using information about a user look from image data of a camera. For example, the vehicle driving controller 100 may determine a state where the user is drowsy and a state where the user is unable to currently drive the vehicle through blinking of the eyes of the user, a yawn of the user, or the like to generate a "mind-off" flag.

Figure 7:
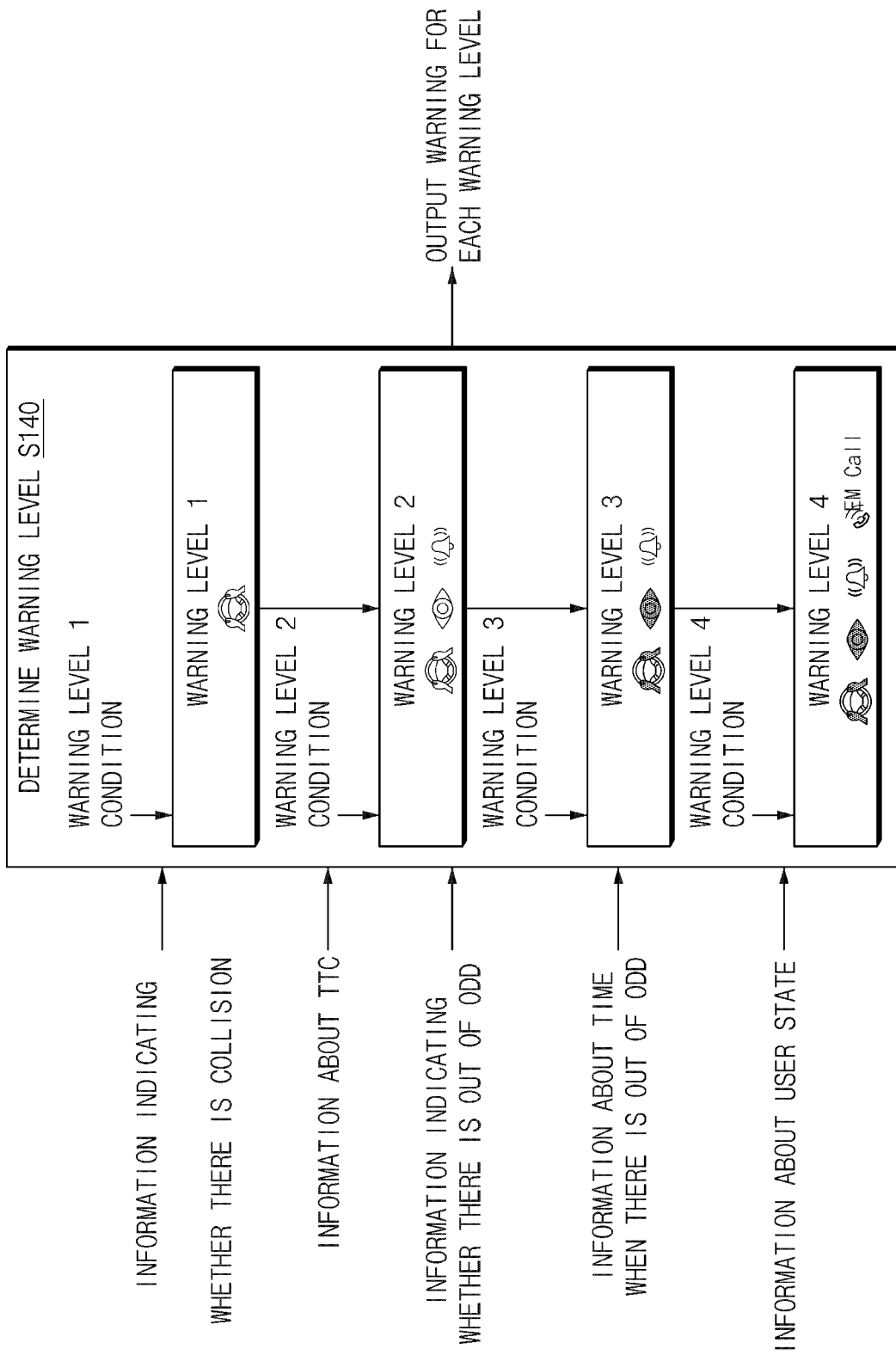
FIG. 7 is a drawing illustrating an exemplary operation of determining a warning level in a vehicle driving controller in one form of the present disclosure.

FIG. 7 is a drawing illustrating an exemplary operation of determining a warning level in a vehicle driving controller in some forms of the present disclosure.

Referring to FIG. 7, in operation S140, a vehicle driving controller 100 of FIG. 1 may determine a warning level using information about whether there is collision, information about a TTC, information about whether there is out of an ODD, information about a time when there is out of the ODD, information about a user state, or the like.

When a "hands-off" state occurs, the vehicle driving controller 100 may provide a notification of a control authority transition demand in warning level 1. In this case, the vehicle driving controller 100 may provide a visual warning.

When the "hands-off" state or an "eyes-off" state occurs, the vehicle driving controller 100 may provide a notification of a control authority transition demand in warning level 2. In this case, the vehicle driving controller 100 may provide a visual warning and a sound notification (a beep sound) in warning level 2.

When the "hands-off" state or the "eyes-off" state occurs, the vehicle driving controller 100 may provide a notification of a control authority transition demand in warning level 3. In this case, the vehicle driving controller 100 may provide a visual warning and a sound notification (a beep sound) in warning level 3, and may output a color different from a color of the visual warning in warning level 2 or may output a level of a notification sound to be higher.

When the hands-off state or the "eyes-off" state occurs, the vehicle driving controller 100 may provide a notification of a control authority transition demand in warning level 4. In this case, the vehicle driving controller 100 may provide a visual warning, a sound notification (a beep sound), and an emergency call mode in warning level 4. In this case, when providing the visual warning and the sound notification, the vehicle driving controller 100 may output a color of the visual warning different from the color of the visual warning in warning level 2 or 3 and may output sound strength stronger than the sound strength in warning level 3.

In FIG. 7, some forms of the present disclosure are exemplified as the vehicle driving controller 100 provides the visual warning, the audible warning, and the emergency call mode for each warning level. However, some forms of the present disclosure are not limited thereto. For example, the vehicle driving controller 100 may provide a warning through various methods capable of providing a warning (notification) such as a tactile warning.

Figure 8:
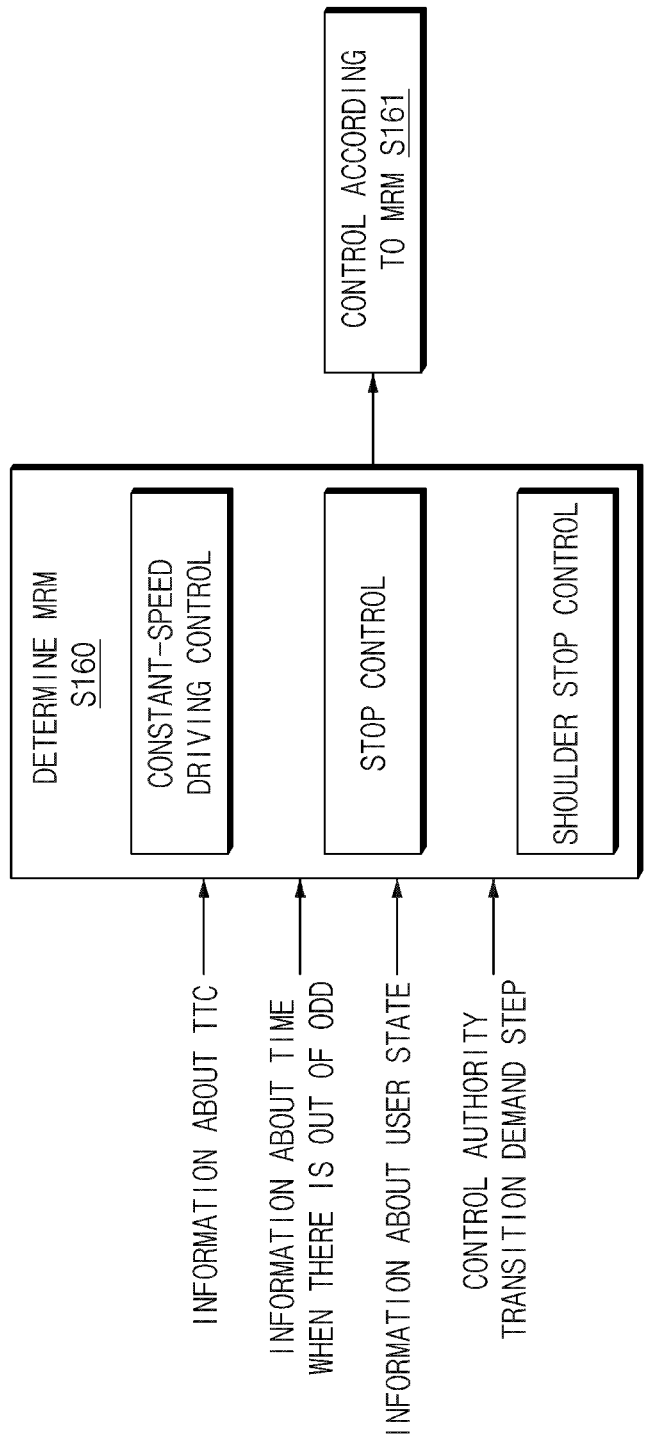
FIG. 8 is a drawing illustrating an exemplary operation of determining a minimum risk maneuver (MRM) in a vehicle driving controller in one form of the present disclosure.

FIG. 8 is a drawing illustrating an exemplary operation of determining an MRM in a vehicle driving controller in some forms of the present disclosure.

Referring to FIG. 8, after providing a notification of a control authority transition demand, when a user does not take over control authority, in operation S160, a vehicle driving controller 100 of FIG. 1 may determine an MRM. In operation S161, the vehicle driving controller 100 may control a vehicle depending on the MRM.

The vehicle driving controller 100 may determine one of constant-speed driving control for performing constant-speed driving after decelerating at a constant speed, stop control for stopping on a corresponding lane, or shoulder stop control for changing a lane to a shoulder and stopping on the shoulder, using such an MRM.

The vehicle driving controller 100 may determine an MRM depending on driving risk and a user state. When the notification of the control authority transition demand is started, the vehicle driving controller 100 may gradually increase a warning level over time to provide the notification of the control authority transition demand and may provide the notification of the control authority transition demand in the highest level in the warning level. When the user does not take over control authority, the vehicle driving controller 100 may determine an MRM and may perform vehicle control.

Figure 9:
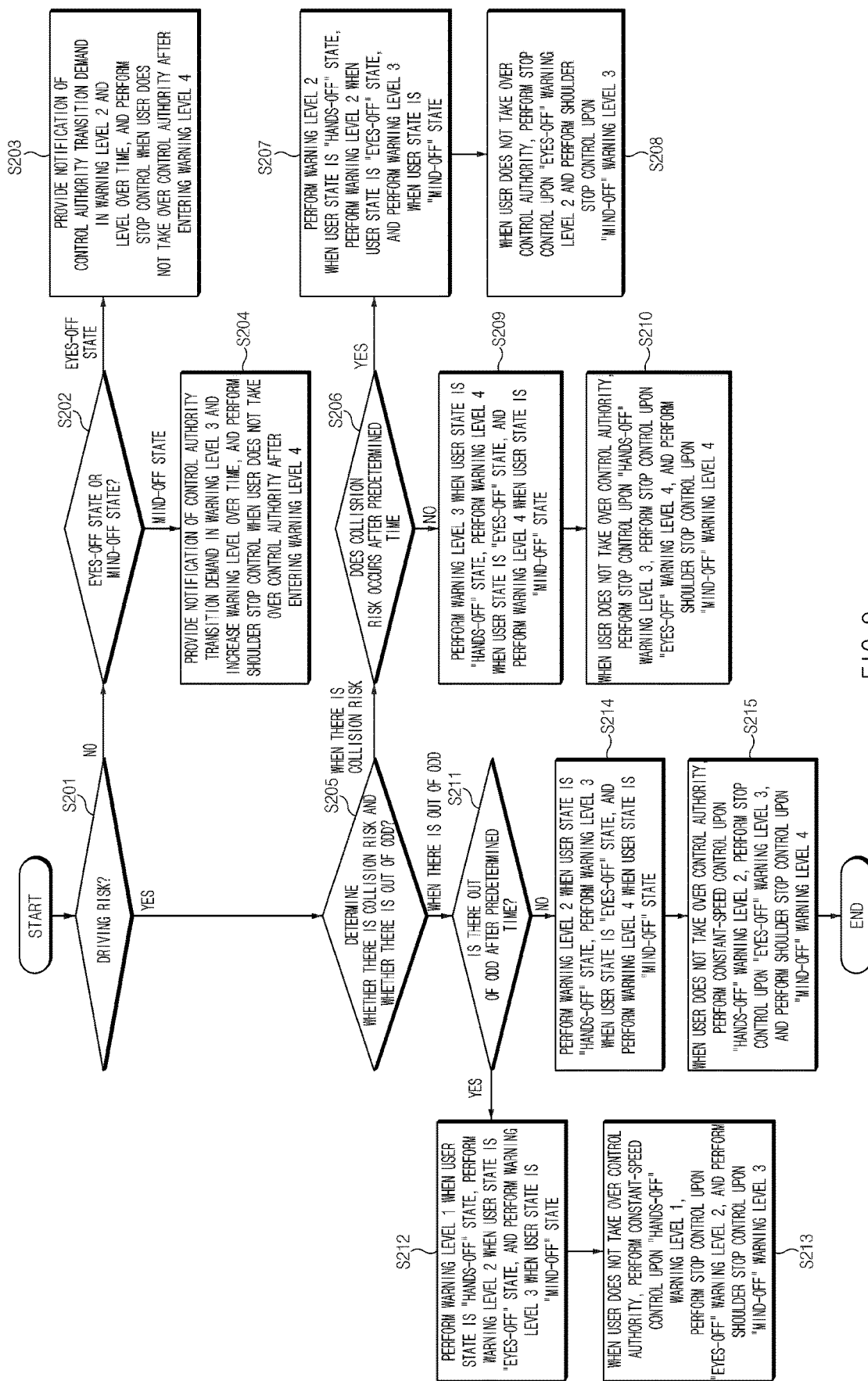
FIG. 9 is a flowchart illustrating a method for determining a warning level according to a driving environment and determining an MRM according to the warning level, in one form of the present disclosure.

Hereinafter, a description will be given in detail of a method for determining a warning level according to a driving environment and determining an MRM according to a warning level in some forms of the present disclosure. FIG. 9 is a flowchart illustrating a method for determining a warning level according to a driving environment and determining an MRM according to the warning level in some forms of the present disclosure.

Hereinafter, it is assumed that a vehicle driving controller 100 of FIG. 1 performs a process of FIG. 9. Furthermore, in a description of FIG. 9, an operation described as being performed by the vehicle driving controller 100 may be understood as being controlled by a processor 130 of the vehicle driving controller 100.

Referring to FIG. 9, in operation S201, the vehicle driving controller 100 may determine whether there is driving risk. When there is no the driving risk, in operation S202, the vehicle driving controller 100 may determine whether the user state is an "eyes-off" state or a "mind-off" state. In this case, when there is no the driving risk, the vehicle driving controller 100 may fail to determine whether the user state is a "hands-off" state. In other words, since the vehicle driving controller 100 is a system activated in the "hands-off" state and an "eyes-on" state, it may fail to provide a "hands-off" warning.

When the user state is the "eyes-off" state in operation S202, in operation S203, the vehicle driving controller 100 may provide a notification of a control authority transition demand in warning level 2, may increase a warning level over time, and may perform stop control when a user does not take over control authority after entering warning level 4.

When the user state is the "mind-off" state in operation S202, in operation S204, the vehicle driving controller 100 may provide the notification of the control authority transition demand in warning level 3, may increase the warning level over time, and may perform shoulder stop control when the user does not take over control authority after entering warning level 4.

Meanwhile, when there is the driving risk in operation S201, in operation S205, the vehicle driving controller 100 may determine whether there is collision risk and whether there is out of an ODD.

When there is the collision risk in operation S205, in operation S206, the vehicle driving controller 100 may determine whether the collision risk occurs after a predetermined time.

When the collision risk occurs after the predetermined time, the vehicle driving controller 100 may determine a warning level depending on a user state.

For example, when the collision risk occurs after the predetermined time, in operation S207, the vehicle driving controller 100 may provide the notification of the control authority transition demand in warning level 2 when the user state is the "hands-off" state, may provide the notification of the control authority transition demand in warning level 2 when the user state is the "eyes-off" state, and may provide the notification of the control authority transition demand in warning level 3 when the user state is the "mind-off" state.

When the user does not take over the control authority, in operation S208, the vehicle driving controller 100 may perform stop control when providing the notification of the control authority transition demand in "eyes-off" warning level 2 and may perform shoulder stop control in "mind-off" warning level 3.

Meanwhile, when the collision is expected earlier (faster) than the predetermined time rather than after the predetermined time, in operation S209, the vehicle driving controller 100 may provide the notification of the control authority transition demand in warning level 3 when the user state is the "hands-off" state, may provide the notification of the control authority transition demand in warning level 4 when the user state is the "eyes-off" state, and provide the notification of the control authority transition demand in warning level 4 when the user state is the "mind-off" state.

After providing the notification of the control authority transition demand, when the user does take over the control authority, in operation S210, the vehicle driving controller 100 may perform stop control upon "hands-off" warning level 3, may perform stop control upon "eyes-off" warning level 4, and may perform shoulder stop control upon "mind-off" warning level 4.

When it is determined that there is out of the ODD in operation S205, in operation S211, the vehicle driving controller 100 may determine whether there is out of the ODD after a predetermined time.

When there is out of the ODD after the predetermined time, in operation S212, the vehicle driving controller 100 may provide the notification of the control authority transition demand in warning level 1 when the user state is the "hands-off" state, may provide the notification of the control authority transition demand in warning level 2 when the user state is the "eyes-off" state, and may provide the notification of the control authority transition demand in warning level 3 when the user state is the "mind-off" state.

After providing the notification of the control authority transition demand, when the user does not take over the control authority, in operation S213, the vehicle driving controller 100 may perform constant-speed driving control upon "hands-off" warning level 1, may perform stop control upon "eyes-off" warning level 2, and may perform shoulder stop control upon "mind-off" warning level 3.

Meanwhile, when it is determined that there is out of the ODD easier than the predetermined time in operation S211, in operation S214, the vehicle driving controller 100 may provide the notification of the control authority transition demand in warning level 2 when the user state is the "hands-off" state, may provide the notification of the control authority transition demand in warning level 3 when the user state is the "eyes-off" state, and may provide the notification of the control authority transition demand in warning level 4 when the user state is the "mind-off" state.

After providing the notification of the control authority transition demand, when the user does not take over the control authority, in operation S215, the vehicle driving controller 100 may perform constant-speed driving control upon "hands-off" warning level 2, may perform stop control upon "eyes-off" warning level 3, and may perform shoulder stop control upon "mind-off" warning level 4.

Figure 10:
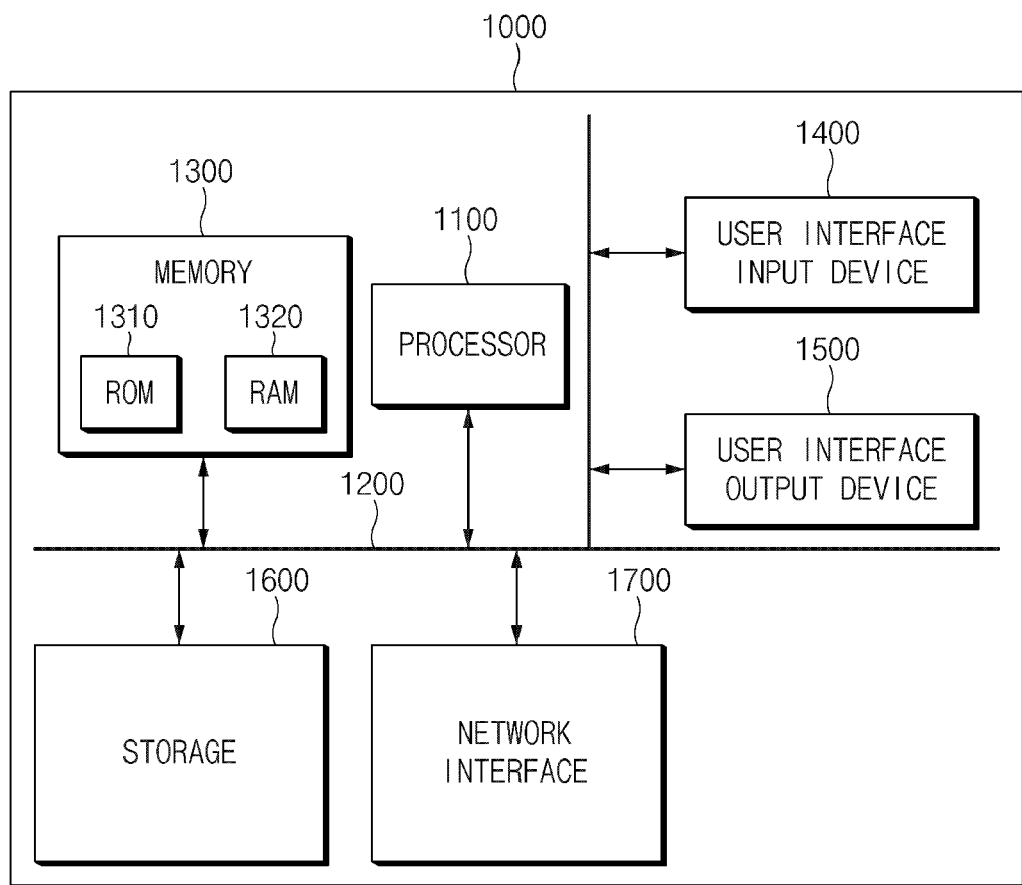
FIG. 10 is a block diagram illustrating a configuration of a computing system in one form of the present disclosure.

FIG. 10 is a block diagram illustrating a configuration of a computing system in some forms of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with some forms of the present disclosure disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The technology of the present disclosure may differently apply a control authority transition demand method depending on a driving environment and/or a user state in an autonomous driving environment such that the user safely copes with a risk situation.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle driving controller, comprising:
   a processor configured to:
      apply a different warning level depending on at least one of a driving situation or a user state during autonomous driving; and
      provide a notification of a control authority transition demand to a user; and
   a storage configured to store information regarding the driving situation and the user state, and information regarding the different warning level,
   wherein the processor is configured to:
      apply the different warning level depending on an expected time of collision risk or an expected time of a deviation of an operational design domain (ODD); and
      determine different minimum risk maneuvers (MRMs) depending on the applied different warning level when a control authority is not handed over to the user after providing the notification of the control authority transition demand depending on the applied different warning level.

2. The vehicle driving controller of claim 1, wherein the driving situation comprises:
   whether there is the collision risk within a predetermined amount of time; and
   whether there is the deviation of the ODD that is configured to perform the autonomous driving.

3. The vehicle driving controller of claim 1, wherein the processor is configured to:

track a static object and a dynamic object;
generate a static grid map and a dynamic object list; and
extract map information.

4. The vehicle driving controller of claim 3, wherein the processor is configured to:
generate a driving trajectory of a host vehicle;
determine whether there is intersection between the driving trajectory of the host vehicle and the static grid map or whether there is intersection between the driving trajectory of the host vehicle and a trajectory of a dynamic object of the dynamic object list; and
determine whether there is collision.

5. The vehicle driving controller of claim 3, wherein the processor is configured to:
determine a deviation time of the ODD and a deviation type of the ODD based on the map information.

6. The vehicle driving controller of claim 5, wherein the deviation type of the ODD comprises:
when the host vehicle is capable of travelling for a predetermined amount of time after the deviation of the ODD; and
when the host vehicle is incapable of travelling after the deviation of the ODD.

7. The vehicle driving controller of claim 1, wherein the processor is configured to:
determine at least one of the user state including a hands-off state, an eyes-off state, and a mind-off state.

8. The vehicle driving controller of claim 7, wherein the processor is configured to:
change and apply a notification reference time depending on the user state.

9. The vehicle driving controller of claim 8, wherein the processor is configured to:
decrease the notification reference time in an order of the hands-off state, the eyes-off state, and the mind-off state.

10. The vehicle driving controller of claim 7, wherein the processor is configured to:
increase the warning level in the order of the hands-off state, the eyes-off state, and the mind-off state.

11. The vehicle driving controller of claim 7, wherein the processor is configured to:
determine whether the user state is the eyes-off state or the mind-off state when no driving risk is present in the driving situation;
determine the warning level based on the determined user state;
provide the notification of the control authority transition demand depending on the determined warning level; and
increase the warning level when a predetermined amount of time elapses.

12. The vehicle driving controller of claim 1, wherein applied different the warning level comprises:
level 1 configured to provide a level 1 visual warning;
level 2 configured to provide a level 2 visual warning and a level 2 audible warning;
level 3 configured to:
provide a level 3 visual warning in a color that is different from a color of the level 1 visual warning and a color of the level 2 visual warning; and
provide a level 3 audible warning that is louder than the level 2 audible warning; and
level 4 configured to:
provide a level 4 visual warning in a color that is different from the color of the level 1 visual warning, the color of the level 2 visual warning, and the color of the level 3 visual warning;
provide a level 4 audible warning with a highest sound magnitude; and
perform an emergency call mode operation.

13. The vehicle driving controller of claim 1, wherein the processor is configured to:
perform a vehicle control depending on the MRMs.

14. The vehicle driving controller of claim 13, wherein the MRMs comprise at least one of a constant-speed driving control after decelerating at a constant speed, a stop control, or a shoulder stop control.

15. The vehicle driving controller of claim 1, further comprising:
a warning device configured to provide a warning corresponding to the applied different warning level.

16. The vehicle driving controller of claim 15, wherein the warning device is configured to:
provide at least one of a visual warning, an audible warning, or an emergency call mode.

17. A vehicle driving control method, comprising:
determining at least one of a driving situation or a user state during autonomous driving;
applying a different warning level depending on at least one of the driving situation or the user state, wherein the different warning level is applied depending on an expected time of collision risk or an expected time of deviation of an operational design domain (ODD);
providing a notification of a control authority transition demand to a user depending on the applied different warning level; and
determining different minimum risk maneuvers (MRMs) depending on the applied different warning level when a control authority is not handed over to the user after providing the notification of the control authority transition demand.

18. The method of claim 17, wherein the method further comprises:
performing a vehicle control depending on the MRMs.

19. The method of claim 17, wherein the driving situation comprises:
the collision risk within a predetermined amount of time; and
the deviation of the ODD that is configured to perform the autonomous driving.

* * * * *